United States Patent [19]

Champa

[11] Patent Number: 5,742,385
[45] Date of Patent: Apr. 21, 1998

[54] METHOD OF AIRPLANE INTERIORS ASSEMBLY USING AUTOMATED ROTATING LASER TECHNOLOGY

[75] Inventor: James L. Champa, Port Orchard, Wash.

[73] Assignee: The Boeing Company, Seattle, Wash.

[21] Appl. No.: 701,906

[22] Filed: Jul. 16, 1996

[51] Int. Cl.[6] .................................................. G01B 11/26
[52] U.S. Cl. ............................................................ 356/141.4
[58] Field of Search ............................ 356/152.1, 141.3, 356/141.4, 138

[56] References Cited

U.S. PATENT DOCUMENTS

| 3,242,340 | 3/1966 | Layne . | |
|---|---|---|---|
| 3,603,691 | 9/1971 | Hamilton | 356/152 |
| 3,857,639 | 12/1974 | Mason . | |
| 4,062,634 | 12/1977 | Rando et al. . | |
| 4,111,564 | 9/1978 | Trice, Jr. . | |
| 4,629,321 | 12/1986 | Hart et al. . | |
| 4,756,617 | 7/1988 | Cain et al. . | |
| 4,889,425 | 12/1989 | Edwards et al. . | |
| 4,973,158 | 11/1990 | Marsh . | |
| 5,100,229 | 3/1992 | Lundberg et al. | 356/1 |
| 5,110,202 | 5/1992 | Dornbusch et al. | 356/1 |
| 5,272,814 | 12/1993 | Key | 33/290 |
| 5,294,970 | 3/1994 | Dornbusch et al. | 356/152 |

*Primary Examiner*—Mark Hellner
*Attorney, Agent, or Firm*—Conrad O. Gardner

[57] ABSTRACT

An apparatus and process for assembling interior components in an aircraft fuselage. A rotating laser is utilized with at least three reference targets and at least one associated part locating target. The reference targets are located in the fuselage and the rotating laser unit establishes a reference plane based on those targets. After establishing the reference plane, a part to be installed is put in approximately its final location and the lasers are used to locate the part based on the at least one attached target for each plane. A control and analysis system is provided in order to properly determine whether the part is in its appropriate position.

4 Claims, 6 Drawing Sheets

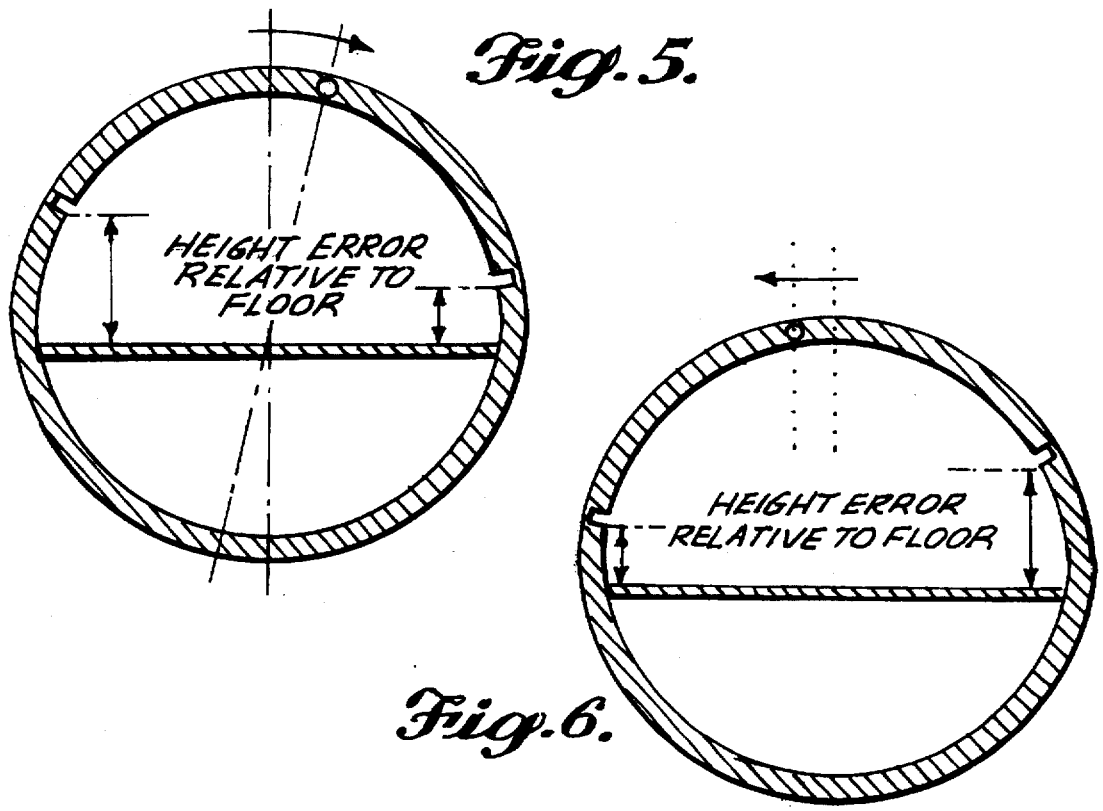
Fig. 5.
Fig. 6.
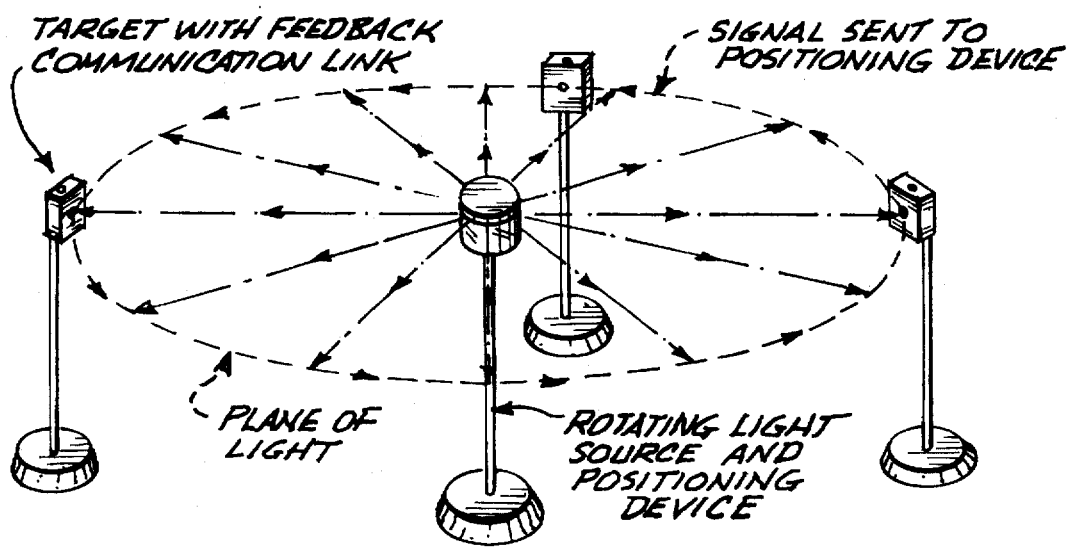
Fig. 7.

METHOD OF AIRPLANE INTERIORS ASSEMBLY USING AUTOMATED ROTATING LASER TECHNOLOGY

BACKGROUND OF THE INVENTION

1. Field of the Invention

The present invention pertains to automated rotating laser technology and more particularly automated rotating laser technology for assembling interior components in an aircraft fuselage.

2. Background Information

In the patent literature, U.S. Pat. No. 3,242,349 (Melvin E. Layne) discloses a system for controlling the position of a mobile station on a grade with respect to a reference station. In this system, the mobile station contains a source of high frequency radiation and the reference station determines whether the source is on the right level and sends an adjustment signal to it. The reference station is oriented with respect to the gravitational field. U.S. Pat. No. 4,062,634 (Joseph F. Rando, et al.) discloses a laser plane generating device with means to adjust the orientation of the plane automatically with respect to the gravitational field. U.S. Pat. No. 4,756,617 (G. L. Cam and S. B. Goren) discloses a system in which a non-planar cone of laser light is generated and a plurality of targets exist with indication means on them to determine when they are positioned in the cone.

SUMMARY AND OPERATION OF THE INVENTION

An apparatus and process for assembling interior components in an aircraft fuselage. The process consists of the use of at least one automated rotating laser unit and at least three associated reference targets and at least one associated part locating target. The reference targets are placed in convenient and consistent locations in the fuselage and the rotating laser unit establishes a reference plane based on the targets. If more than three targets are used in a given plane, a least square fit plane is established as the reference. If a second plane is necessary to locate the part to be installed, another laser and its associated reference and part locating target(s) are used. Once the reference planes are established, the part to be installed is put approximately in its final location and the attached targets are used to accurately locate the part. Any convenient means may be used to adjust the position of the part and secure it in its proper location. The apparatus of the invention includes the rotating laser, the targets and the control and analysis system. The position of the laser on the targets is communicated from local units on the targets via infrared transmission to the central control unit at the laser. The laser is adjusted automatically to establish the desired plane by analysis of this information. In the installation phase, the position of the laser on each reference target is transmitted via the infrared system to the central control unit and signals from the central processing unit defining reference values for the local signal processor to use. The central control unit also provides statistical process control functions.

BRIEF DESCRIPTION OF THE DRAWING(S)

FIG. 5 shows the effect of misaligned station frame relative to the floor;

FIG. 6 is illustrative of the effect of an incorrectly located K-hole on a station frame;

FIG. 7 is illustrative of the present system invention showing configuration of components;

DESCRIPTION OF THE PREFERRED EMBODIMENT(S)

CURRENT INTERIORS ASSEMBLY PROCESSES

Figure 1:
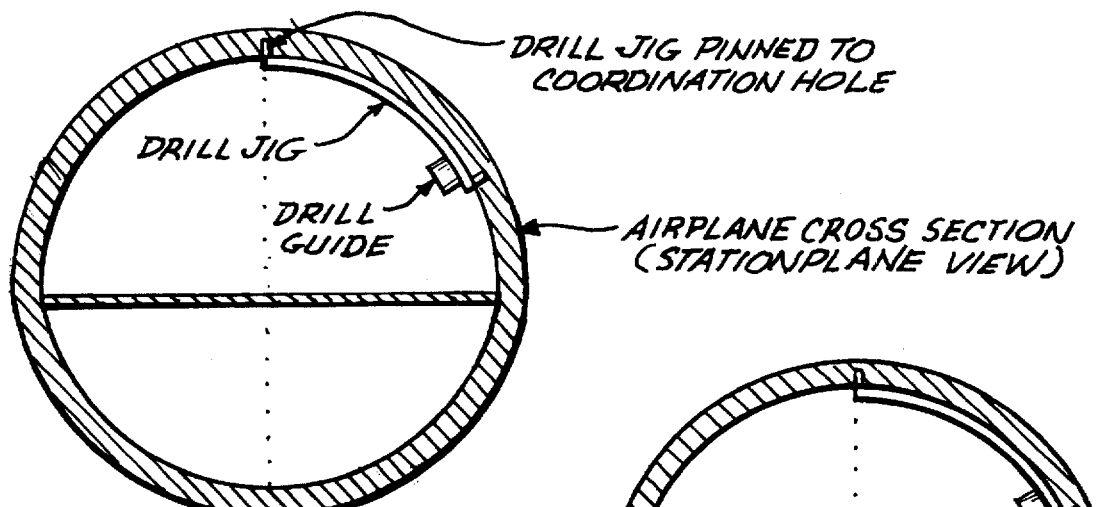
FIG. 1 is a schematic representation of an aircraft fuselage cross section showing a current interior shock mount drilling process.

Current processes used to align interiors parts and assemblies typically use large, heavy, and cumbersome jigs and fixtures that are used to provide a platform or index against which a part or assembly is aligned. Assembly tools are first loaded in the airplane and then positioned relative to an index, typically coordination holes (commonly referred to as k-holes). Proper part/assembly alignment depends on (1) accuracy of the tools used to perform alignment and (2) accuracy of the index to which the tool is mounted. For example, during the installation of airplane interior side panel shock mounts, a drill jig is used to guide a drill at known waterline values on a station from (see FIG. 1).

Figure 2:
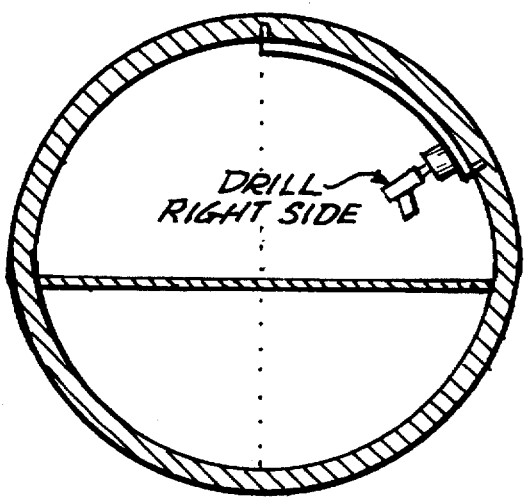
FIG. 2 is illustrative of the shock mount drilling process with drill at the right side location.
Figure 3:
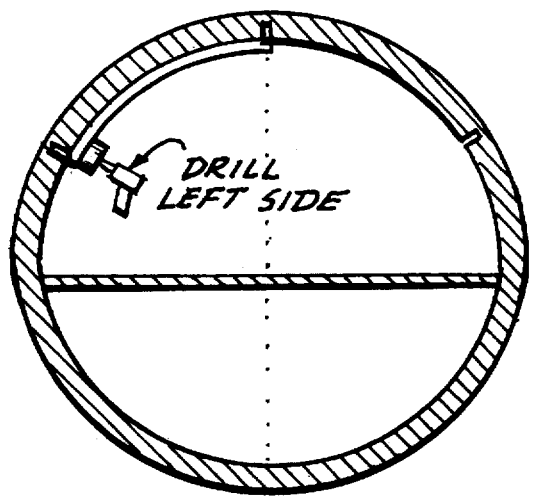
FIG. 3 is illustrative of the shock mount drilling process with drill at the left side location.

First, the drill jig is pinned to a k-hole near the top of an aircraft body frame. Oftentimes, several intermediate tools are connected from the overhead k-hole to the drill jig to provide the required drill location (not shown in figure for simplicity). Next shock mount holes are drilled per the drill jig location (see FIGS. 2 and 3).

Figure 4:
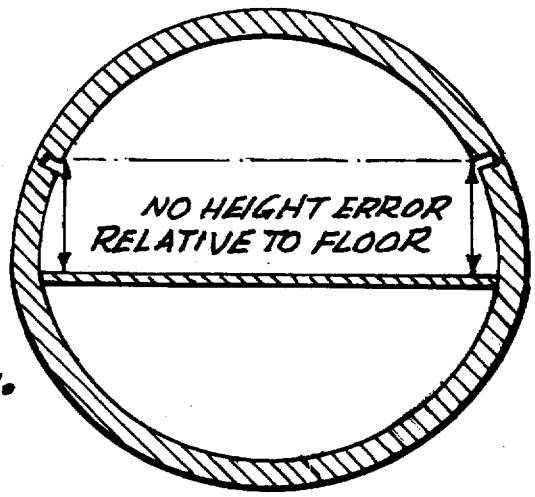
FIG. 4 is illustrative of the desired situation for a given station frame, the ideal case with no height error.

Then, the drill jig is removed and pinned to the next aircraft frame k-hole. The process is repeated for the entire set of aircraft station frames. The result is a set of shock mount holes that are supposedly at the same correct waterline—a straight line (see FIG. 4 showing the desired situation for a given station frame). Necessary requirements for a straight line of holes along the length of the airplane are: (1) every k-hole is at the same location in every station frame, (2) every station frame is positioned correctly in the airplane, and (3) the drill jig and intermediate tools are properly attached to the k-hole. However, misaligned shock mount holes are a common problem. FIG. 5 shows the effect of a misaligned station frame relative to the floor and FIG. 6 shows the effect of an incorrectly located k-hole on a station frame (FIG. 5 does not show the lower lobe to illustrate frame misalignment better.). In general, both problems are present on a given station frame.

Misalignment problems occur and are well known in stowage bins, rails and interiors bracketry. In the case of stowage bins, additional problems occur. The tools used to align stowage bins are heavy, large, and cumbersome; each tool weighs about 200 pounds and is nearly 6 feet tall. One tool for each stow bin must be wheeled inside the airplane. These tools easily cause damage to floor panels, hatches, and side walls. They are a health and safety hazard—a source of back strain and hazards to feet and hands.

A significant negative impact from misaligned interiors structures is airline customer dissatisfaction with the overall appearance of cabin spaces. The human eye can easily discern wavy or kinked lines (variations as small as 0.050 inch) which commonly occur using piece-wise assembly processes described above. From the foregoing description and understanding of current aircraft interior assemblies processes, an appreciation for the objects and advantages of the hereinafter described automated rotating laser figment system will be had. However, it will be appreciated that airplane interiors assembly using automated rotating laser technology in accordance with the present invention solves the problem of misaligned interiors parts and assemblies, including, but not limited to stowage bins, rails & ladders, bracketry, lavatories, galleys and panels. Additionally, the hereinafter described technology is applicable to tooling, providing continuous monitoring of large tools. The outstanding advantages realized from the present automated rotating laser technology include: (1) significantly improved product quality, (2) drastically reduced number of jigs and fixtures, (3) simplified tooling, (4) improved ergonomics, (5) improved workplace safety, and (6) provides data for manufacturing process control.

AUTOMATED ROTATING LASER ALIGNMENT SYSTEM IN ACCORDANCE WITH A PREFERRED EMBODIMENT OF THE INVENTION

The present manufacturing process using automated rotating laser technology hereinafter described solves the problems caused by the herein before described current interiors assembly tooling and processes. An automated rotating laser system in accordance with the invention consists of the following components:

Rotating light source. A rotating light source has a rotating optical component that projects the light (typically a laser beam) perpendicular to the axis of rotation. The result is a plane of light that extends in all directions. Its operation is analogous to a lighthouse.

Photocell. A photocell, commonly referred to as a target, detects the light beam as it sweeps across its surface. The photocell measures the position of the light beam on its surface very accurately (the typical certified accuracy of the beam on the target is ±0.001 inch).

Signal Processing Unit. The target is connected to a Signal Processing Unit which interprets the laser beam position on the target and displays information to an operator (typically using an LED display and colored indication lights). The Signal Processing Unit has additional user-adjusted parameters hereinafter described.

Light Beam Positioning Device & Feedback System. The light beam position on the target is also converted to a signal that is sent to a Light Beam Positioning Device. The signal provides wireless communication from the target to the laser. The Light Beam Positioning Device interprets the received signals to drive the light beam to a specified location on the target. The operation is a feedback system: if the light beam is not sweeping a target where it is supposed to be, the Light Beam Positioning Device drives the light beam to its required location. Thus, the feedback system constantly monitors light beam position and continuously drives it to the required location on the target.

FIG. 7 depicts the system components with a basic set-up. It should be noted that the light plane actually extends indefinitely in all directions; it is drawn as an ellipse in this diagram for simplicity.

The system described incorporates a laser diode as the light source and an infrared (IR) feedback signal. This system has been successfully tested and is Boeing certified. The entire system is portable and lightweight. The target is enclosed in a housing that measures about 1.5"×2"×5". The signal processing unit is a hand-held device. The targets and their signal processing units are battery operated. The laser, positioning device and infrared feedback system are integrated into a single housing weighing less than 15 pounds.

SYSTEM SET UP AND OPERATION

As hereinafter described, the laser beam sweeps a 360 degree circle; therefore, it can be thought of as an infinite light plane (that is, extending in all directions indefinitely from the laser source). Any number of targets can be placed around the laser to intercept the light plane and interpret their position relative to the light plane (hereafter termed laser plane). In a typical interiors manufacturing process, the present system works as follows:

1. At least three targets (three points are required to defined a plane) are placed at different locations in the airplane. They are mounted such that the center of each target is at the same coordinate value (waterline, buttockline, or stationline).

2. The laser, positioning device, and infrared feedback unit are mounted anywhere inside (or outside) the airplane such that the laser beam illuminates the three targets.

3. When the laser is powered on, the beam strikes the three targets somewhere on their faces. Laser beam position data from all three targets is sent to the positioning device via infrared feedback. The positioning device drives the laser beam to the same "zero" position on all three targets. When that happens, the laser plane can be thought of as a reference. The mathematical idea of a reference plane is now an actual physical object (the laser plane). The laser plane can be oriented in a reference waterline, buttockline, or stationline (or any other plane defined by three points).

4. Once a reference laser plane is established, the interiors installation process can begin. Additional targets are attached to a part of assembly. The reference laser plane illuminates those targets, giving the alignment status of the part/assembly relative to the reference laser plane. The part/assembly with attached targets is moved to a prescribed location (as indicated by the LED displays on the signal processing units) by some mechanical means (tie rod, clamp, rivet, etc.). Thus, the part/assembly is in accurate alignment relative to the reference laser plane.

Figure 8:
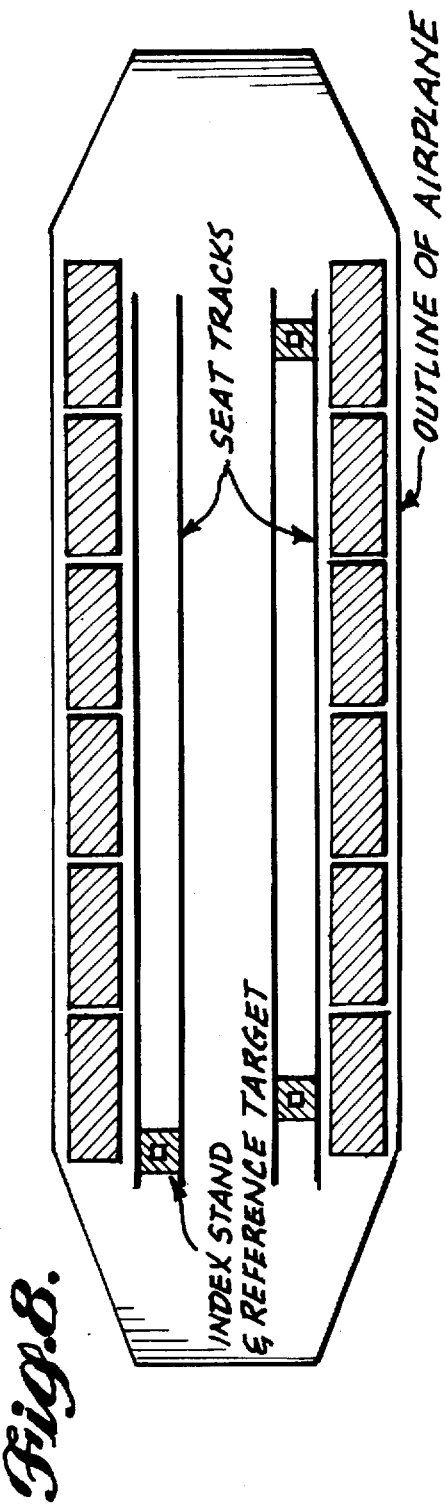
FIG. 8 is illustrative of the present installation process for stowage bins showing targets mounted to three index stands and a plan view of index stand placement.
Figure 9:
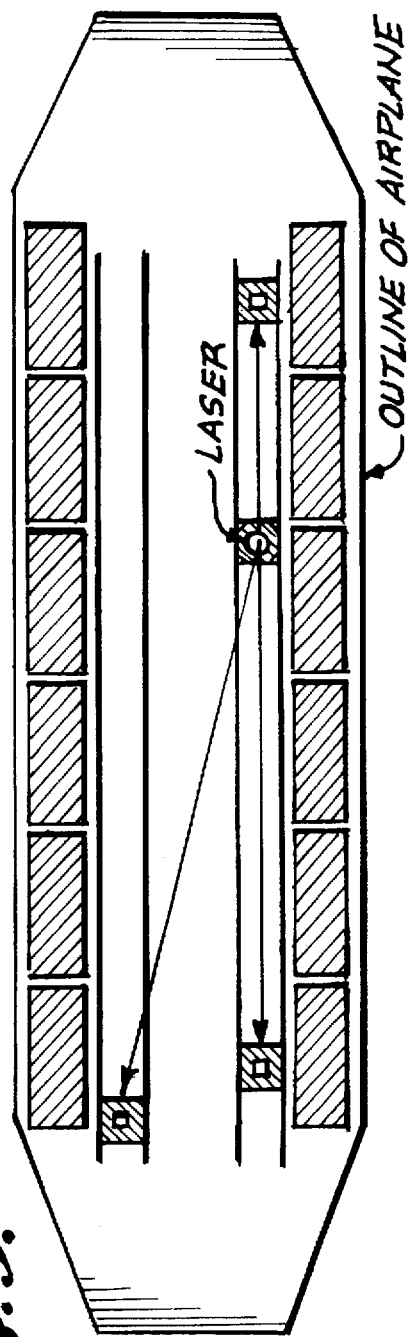
FIG. 9 is a plan view showing laser stand placement with laser powered to illuminate three targets.

A specific exemplary use of the present process is in the installation of airplane stowage bins. The following steps and diagrams illustrate the process:

1. Three targets are mounted to three index stands. The index stands are mounted to seat tracks. Each target is at the same (waterline) location on every stand (see the plan view index stand placement shown in FIG. 8).

2. The laser is placed anywhere in the airplane and powered on to illuminate the three targets (see FIG. 5b below showing laser stand placement). The light plane is automatically driven to its required position on the (reference) targets to establish a reference (waterline) laser plane.

Figure 10:
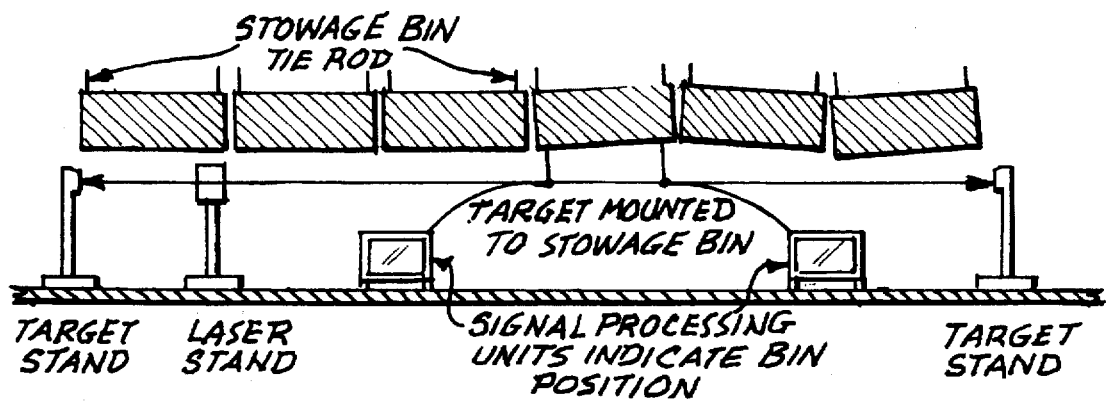
FIG. 10 is a schematic view of the present rotating laser system stowage bin alignment process proceeding from left to right.

3. Targets are attached to one stowage bin and are illuminated by the reference laser plane. Their signal processing units indicate stowage bin position relative to the reference laser plane. Tie rods connecting the stowage bin to the airplane frame are mined to move the stowage bin into accurate alignment as indicated by the signal processing units. FIG. 10 shows a side view alignment proceeding from left to right utilizing the present laser system stowage bin alignment process.

The targets are removed from the accurately aligned stowage bin and attached to the next stowage bin. The process is repeated until all stowage bins are accurately aligned.

In the process herein above described, it is actually the case that a second laser and three additional reference targets are required to establish a buttockline reference laser plane. Stowage bin alignment requires waterline and buttockline alignment.

The buttockline reference targets are attached to the same stands as the waterline reference targets.

BENEFITS FROM THE USE OF THE PRESENT AUTOMATED ROTATING LASER ALIGNMENT SYSTEM INVENTION

Figure 11:
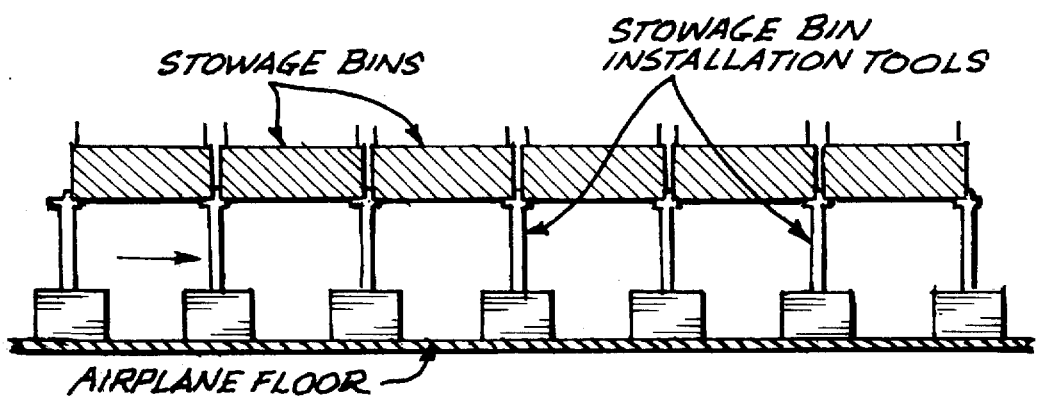
FIG. 11 is a drawing depicting current stowage bin installation tools.
Figure 12:
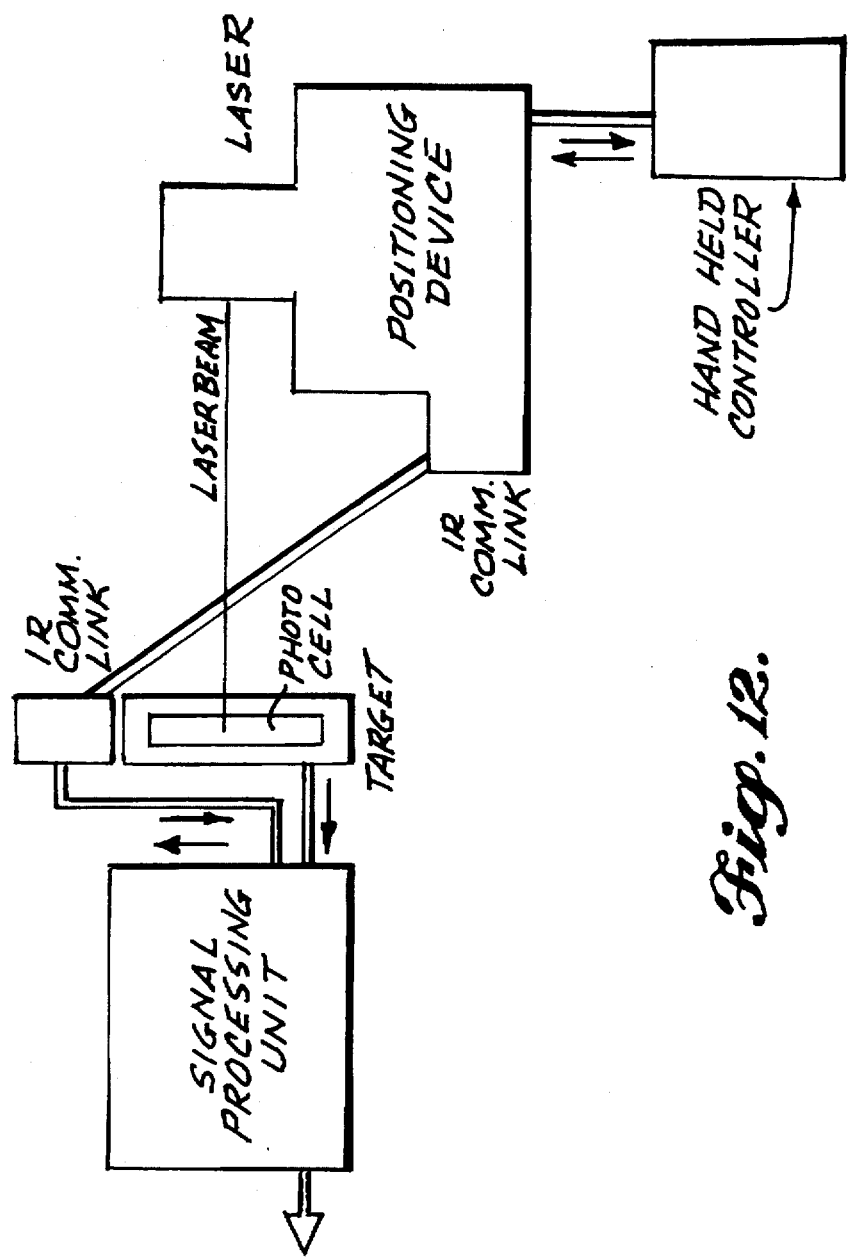
FIG. 12 is a block diagram showing laser, hardware components, data and communication paths in accordance with a preferred embodiment of the present invention.

Two important advantages over current tools and processes are realized from the use of the present rotating laser technology. First, tool size, weight, and number, is significantly reduced. Second, alignment quality, measured by straightness and secondary structures fitting is improved. In the case of stowage bin alignment, e.g. heavy (200 pounds each) tools are completely eliminated. In the case of, e.g. side panel shock mount alignment, 260 traditional tools are replaced by 10 automated rotating laser tools. Instead, small hand-held tools are attached to the stowage bin. Furthermore, stowage bin alignment is now insensitive to local variability in seat track alignment (the current tools index to seat tracks making stowage bin alignment sensitive to local seat track variability). FIG. 11 below depicts current stowage bin installation tools. Compare this with FIG. 10 showing the reduction in the size and number of tools.

Another important benefit from the presently described automated rotating laser manufacturing processes is that installation and alignment is quantified. Digital target data from the signal processing units is automatically exported to a spreadsheet database on a lap top computer. Thus, interiors manufacturing processes can be analyzed using the techniques of statistical process control. Installation data can also be archived for subsequent use. Quantitative analysis of interiors manufacturing processes is presently not available; automated rotating laser technology makes it available now. Manufacturing process improvements are made possible from quantified manufacturing processes.

The present automated rotation laser system incorporates features that makes it useful in a wide variety of factory settings. This is accomplished by its ability to filter accuracy degrading effects from a wide spectrum of time scales and length scales. Short amplitude mid- to high-frequency vibrations coupled through the airplane (e.g., walking in the airplane and riveting/drilling) are filtered by simple averaging algorithms in the signal processing unit. Atmospheric turbulence, which has a degrading effect on laser beam straightness, is filtered by the same averaging algorithms. Large amplitude laser beam drift due to other mechanical disturbances (e.g., a bump to the laser stand) is corrected by the laser beam positioning device/infrared feedback system. Large amplitude, low frequency laser beam drift due to thermal expansion or contraction of large structures is corrected in the same way. System operation is configured by a hand-held controller connected to the laser. System operating parameters include:

pulse average number. Signal processing algorithms count the number of laser beam sweeps across the target face and compute the average position value. In a noisy, turbulent environment, several beam sweeps are required to achieve stable numbers on the Signal Processing Unit LED display. In a stable environment, only a few beam sweeps are required to be averaged for stable readings. In any situation, the operator chooses the smallest pulse average number to achieve stable readings.

zero offset. Normally, the electrical center of the photocell is displayed as the "zero" position. However, with the zero offset function, "zero" can be defined anywhere on the photocell, and this feature is important in some applications.

tolerance band. The operator enters the tolerance band for a given installation to activate LED lights on the Signal Processing Unit. A yellow flashing light appears if the beam lies outside this band, and a green steady light appears if the beam lies inside this band.

THE GENERALIZED PROCESS

The present automated rotating laser system can be used for a wide variety of manufacturing processes. The minimum requirements for its use are:

Establish at least three locations for the placement of reference targets and ensure an unobstructed line-of-sight between the laser and each target. (Using more than three targets allows the use of least squares algorithms to locate a best fit reference plane). This setup establishes one laser plane. Additional laser planes will require one laser and at least three targets per laser plane.

Provide a tool(s) to attach target(s) to the part or assembly to be aligned and installed.

Provide a mechanical means to move the part or assembly with attached target(s) into accurate alignment. In some cases, the airplane already provides the means, e.g. stowage bin tie rods.

DETAILS OF LASER HARDWARE COMPONENTS DATA AND COMMUNICATIONS PATHS

Laser Hardware Operation:

a. The laser generates a beam of collimated electromagnetic radiation.

b. The photocell (lateral effect cell) intercepts the laser beam; photocell generates a voltage proportional to laser beam vertical position on photocell.

c. An A/D converter transforms voltage into 16 bit digital signal which is processed by an on-board Dallas 5000T 8051 microcontroller.

d. The target output (see 2 above) is 16 bit digital data. The target is directly connected to the Signal Processing Unit.

e. The Signal Processing Unit contains a 8051 microcontroller, LED driver with display (shows laser beam position on target), and a TTL to RS232 converter module. It is a hand-held device with an internal rechargeable battery. The Signal Processing Unit also performs the following functions:

Control panel on enclosure allows operator to modify center offset, enable/disable offset, sample number, and deviation tolerance.

Transmits data to IR communication link

TTL to RS232 converter module can directly connect to an IBM PC RS232 port using null modem cable. Thus, position data can be archived for subsequent analysis (e.g., statistical techniques for process improvement, etc.)

f. The Infrared Communication Link (IR Comm Link) transmits digital position data and operator commands (from the SPU or hand-held controller) to and from the SPU and Positioning Device Incorporates a two-layer transmission protocol to filter erroneous packet data.

g. The Positioning Device contains two microprocessors, power supply circuitry, motor control circuitry, and IR transmission circuitry. The first (host) processor is a 8086 MSDOS computer which obtains information from the slave processor, processes data, calculates stepper motor moves, and commands stepper motors to move to updated positions. The second (slave) processor is a 8051 microcontroller. It has complete control over all hardware in the position device, including step pulses to the stepper motors, monitoring the hand-held controller, monitoring the IR communication link, and verifying that the power supply is within specification.

The stepper motors raise/lower & pitch/roll the laser head to drive the laser beam to prescribed locations on the targets.

h. The battery powered hand-held controller allows the operator to modify the following system parameters to any SPU/target while standing at the laser/positioning device: center offset, enable/disable offset, sample number, and deviation tolerance. Additionally, the hand-held controller incorporates a LCD monitor that displays target position data and IR Communication Link status, IR COMM ERROR is displayed in the event of faulty IR communication on any IR channel.

Figure 13:
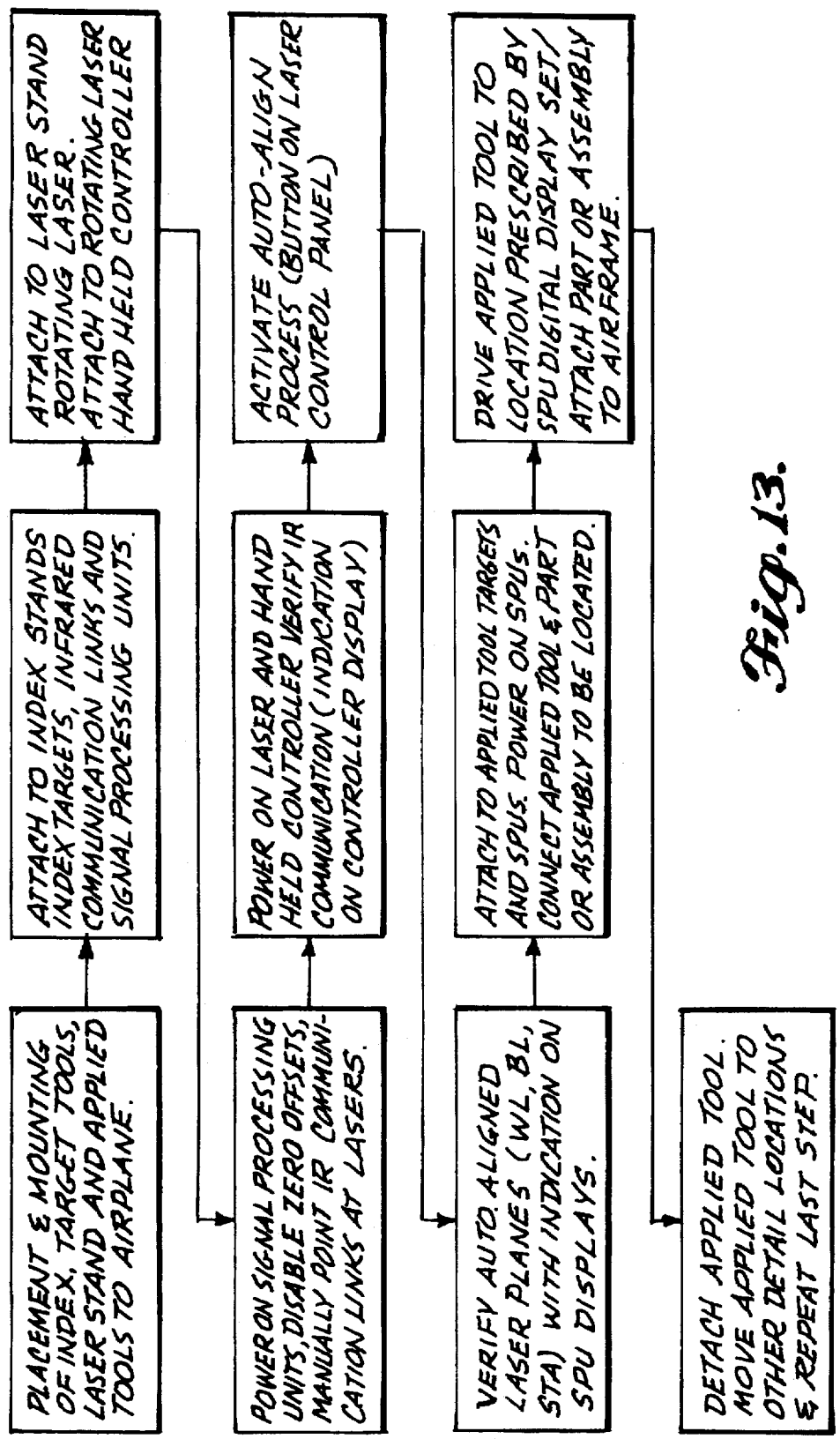
FIG. 13 is illustrative in block diagram form of the present rotating laser method for part alignment.

A block diagram to assist the operator with a typical system set up for using the present rotating laser system for assembling parts in an exemplary aircraft environment is shown in method stages in FIG. 13.

CONCLUSION

Manufacturing processes utilizing the herein above described automated rotating laser system offers the following advantages over existing manufacturing processes:

current tooling is eliminated or significantly simplified rework is significantly reduced or eliminated, therefore reducing flow time alignment and installation processes are simplified installation processes are quantified, making possible statistical process control easily adaptable to engineering changes compared to current tooling amenable to common processes in aircraft and other applications working environment is safer, improved ergonomics

What is claimed is:

1. Apparatus for assembling interior components in an aircraft fuselage comprising in combination:

a rotating laser;

at least three reference targets;

at least one part locating target;

said at least three reference targets disposed in said aircraft fuselage;

said rotating laser establishing a reference plane based on said at least three reference targets disposed in said aircraft fuselage;

said interior components disposed in their approximate final locations; and said rotating laser utilized to locate said interior components based upon said at least one part locating target.

2. A method for part alignment comprising the steps of:

establishing at least three locations for the placement of a plurality of reference targets;

providing a rotating laser having an unobstructed line of sight between said rotating laser and each of said plurality of reference targets thereby establishing one laser plane;

installing the part requiring alignment; and, then moving the part into alignment.

3. The method of claim 2 including the further plurality of reference targets; and providing a further rotating laser having an unobstructed line of sight between said further rotating laser having an unobstructed line of sight between said further rotating laser and said further plurality of reference targets thereby establishing a further reference plane.

4. A laser system comprising in combination:

a laser;

a plurality of reference targets on a platform that is dynamically changing;

first means for automatically and continuously realigning said laser to said reference on a platform that is dynamically changing; and said first means including an infrared feedback communication system for continuously providing said laser with reference target data for realigning said laser to said plurality of reference targets.

* * * * *